United States Patent
Yamaguchi

(10) Patent No.: US 9,566,835 B2
(45) Date of Patent: Feb. 14, 2017

(54) STRUCTURE FOR ATTACHING ELECTRONIC COMPONENT TO INNER SURFACE OF PNEUMATIC TIRE

(71) Applicant: BRIDGESTONE CORPORATION, Chuo-ku, Tokyo (JP)

(72) Inventor: Shigeru Yamaguchi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 184 days.

(21) Appl. No.: 14/394,657

(22) PCT Filed: Apr. 22, 2013

(86) PCT No.: PCT/JP2013/061792
§ 371 (c)(1),
(2) Date: Oct. 15, 2014

(87) PCT Pub. No.: WO2013/161762
PCT Pub. Date: Oct. 31, 2013

(65) Prior Publication Data
US 2015/0122006 A1 May 7, 2015

(30) Foreign Application Priority Data

Apr. 24, 2012 (JP) ................................. 2012-098515

(51) Int. Cl.
*B60C 23/04* (2006.01)
*B29D 30/00* (2006.01)

(52) U.S. Cl.
CPC ........... *B60C 23/04* (2013.01); *B60C 23/0493* (2013.01); *B29D 2030/0072* (2013.01)

(58) Field of Classification Search
CPC .............................. B60C 23/0493; B60C 23/04
(Continued)

(56) References Cited

U.S. PATENT DOCUMENTS 6,030,478 A * 2/2000 Koch ...................... B60C 23/04
152/152.1
6,885,291 B1 * 4/2005 Pollack ............... B60C 23/0493
116/34 R
(Continued)

FOREIGN PATENT DOCUMENTS

CN 101326065 A 12/2008
CN 102271932 A 12/2011
(Continued)

OTHER PUBLICATIONS

International Search Report of PCT/JP2013/061792 dated May 21, 2013.
(Continued)

*Primary Examiner* — Michael A Lyons
*Assistant Examiner* — Hoang Nguyen
(74) *Attorney, Agent, or Firm* — Sughrue Mion, PLLC

(57) ABSTRACT

A structure 11 for attaching an electronic component to the inner surface of a pneumatic tire includes: a case 13 which has a bottom plate 18 a side wall 19 and a lid 20 and in which the electronic component is mounted inside an inner space defined by these; and a rubber patch 12 disposed between the case 13 and the inner surface of the pneumatic tire. The rubber patch 12 has a bottom surface 14 to be attached to the inner surface of the pneumatic tire, and a front surface 15 provided on the opposite side from the bottom surface. A seating surface 17 having such a shape as to be capable of receiving the bottom plate 18 of the case 13 is formed in the front surface 15. The rubber patch 12 has a groove 21 in the front surface 15.

5 Claims, 4 Drawing Sheets

(58) Field of Classification Search
USPC .............................. 73/146–146.8; 152/152.1
See application file for complete search history.

(56) References Cited

U.S. PATENT DOCUMENTS

| | | | | |
|---|---|---|---|---|
| 7,009,506 B2* | 3/2006 | Wilson | ................ | B60C 23/0493 152/152.1 |
| 7,881,066 B2* | 2/2011 | Scheungraber | ..... | B60C 23/0493 361/749 |
| 8,685,527 B2* | 4/2014 | Cubizolle | ........... | B60C 23/0493 152/367 |
| 8,863,570 B2* | 10/2014 | Gougnaud | .......... | B60C 23/0493 73/146 |
| 2005/0076992 A1* | 4/2005 | Metcalf | ............... | B60C 23/0493 156/110.1 |
| 2005/0126668 A1* | 6/2005 | Fornerod | ............ | B60C 23/0493 152/152.1 |
| 2006/0158340 A1 | 7/2006 | Wilson et al. | | |
| 2007/0175554 A1 | 8/2007 | Bertrand | | |
| 2009/0173422 A1* | 7/2009 | Utsumi | ............... | B60C 23/0493 152/510 |
| 2011/0315292 A1 | 12/2011 | Gougnaud | | |
| 2013/0220503 A1* | 8/2013 | Shouyama | .............. | B29C 73/10 152/450 |
| 2014/0103186 A1* | 4/2014 | Nagaya | .................. | F16M 13/02 248/634 |
| 2014/0373991 A1 | 12/2014 | Gougnaud | | |

FOREIGN PATENT DOCUMENTS

| | | |
|---|---|---|
| JP | 2002-211222 A | 7/2002 |
| JP | 2005-532551 A | 10/2005 |
| JP | 2006-021611 A | 1/2006 |
| JP | 2007-176479 A | 7/2007 |
| JP | 2009-198505 A | 9/2009 |
| WO | 2004/005054 A1 | 1/2004 |

OTHER PUBLICATIONS

Communication dated Nov. 17, 2015, from the European Patent Office in counterpart European Application No. 13782439.7.
Communication dated Dec. 25, 2015, from the State Intellectual Property Office of People's Republic of China in counterpart Application No. 201380019680.5.

* cited by examiner

STRUCTURE FOR ATTACHING ELECTRONIC COMPONENT TO INNER SURFACE OF PNEUMATIC TIRE

CROSS REFERENCE TO RELATED APPLICATIONS

This is a National Stage of International Application No. PCT/JP 2013/061792 filed Apr. 22, 2013, claiming priority based on Japanese Patent Application No. 2012-098515 filed Apr. 24, 2012, the contents of all of which are incorporated herein by reference in their entirety.

TECHNICAL FIELD

The present invention relates to a structure for attaching an electronic component to the inner surface of a pneumatic tire, and in particular to a structure for attaching an electronic component in which the durability of a rubber seat is improved.

BACKGROUND ART

Devices such as a TPMS (tire-pressure monitoring system) for monitoring the condition of a pneumatic tire (hereinafter, simply referred to also as "tire") have been known. Using this type of device involves mounting an electronic component such as a sensor to the inner surface of the tire, so as to collect data that indicates the condition of the tire during travel. For example, Patent Literature 1 discloses a rubber patch which holds a monitoring device in a detachable and re-attachable manner.

The tire repeatedly deforms when contacting a road surface during travel. Thus, the rubber seat or patch, which is an elastic body, repeatedly deforms as well by following the deformation of the tire. Here, the electronic component is housed in a case made of hard resin to prevent failure due to shock. For this reason, the case of the electronic component does not follow the deformation of the tire. In other words, stress resulting from the deformation of the tire is all absorbed by the rubber patch. This leads to a problem in that travelling with the tire for a long period of time results in cracking of the rubber patch, detachment of the bonding surfaces of the case of the electronic component and the rubber patch, and the like.

CITATION LIST

Patent Literature

Patent Literature 1: Japanese Patent Application Publication No. 2009-198505

SUMMARY OF INVENTION

A structure for attaching an electronic component to an inner surface of a pneumatic tire according to a first aspect includes: a case which has a bottom plate, a side wall, and a lid and in which the electronic component is mounted inside an inner space defined by the bottom plate, the side wall, and the lid; and a support made of rubber and disposed between the case and the inner surface of the pneumatic tire. The support has a bottom surface to be attached to the inner surface of the pneumatic tire, and a front surface provided on the opposite side from the bottom surface. A seating surface having such a shape as to be capable of receiving the bottom plate of the case is formed in the front surface. The support has a groove in the front surface.

In the first aspect, the groove is separated from an edge of the seating surface by a predetermined distance.

In the first aspect, the groove is formed in such a way as to surround an edge of the seating surface.

In the first aspect, the case has a protrusion on the side wall, and the support has a recess engageable with the protrusion.

In the first aspect, the bottom plate of the case has a curved shape having a center of curvature thereof inside the case.

DESCRIPTION OF EMBODIMENT

Hereinbelow, an embodiment of the present invention will be described in detail with reference to the drawings. Note that in the illustration of the drawings below, the same or similar portions are denoted by the same or similar reference signs. It is, however, to be noted that the drawings are schematic, and the dimensional ratios and the like differ from the actual ones. Thus, the specific ratios and the like should be determined by taking into account the following description. In addition, some drawings may include portions which differ from one drawing to another in dimensional relationship and ratio, as a matter of course.

Figure 1:
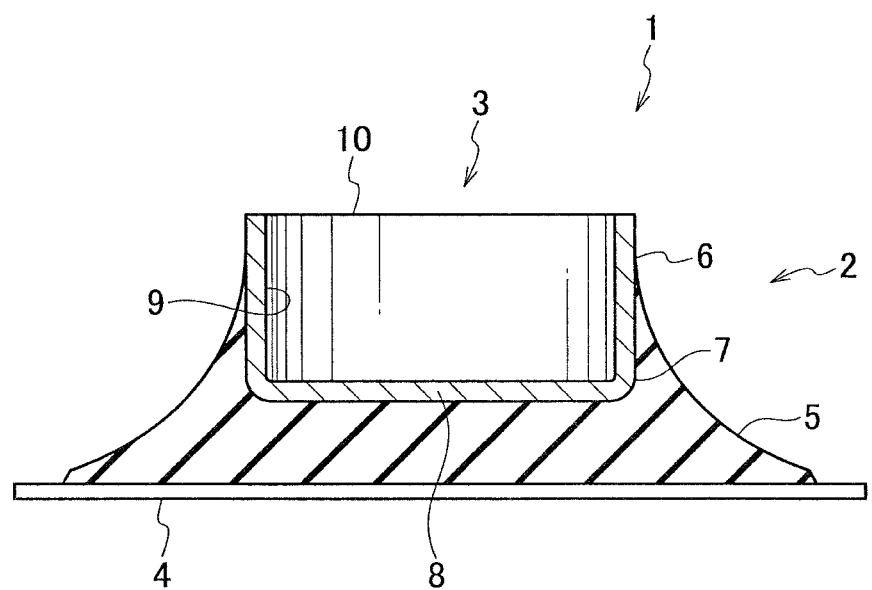
FIG. 1 is a cross-sectional view of a structure for attaching an electronic component according to a conventional technique.

FIG. 1 is a cross-sectional view of a structure for attaching an electronic component according to a conventional technique. A structure 1 for attaching an electronic component includes a rubber patch 2 and a case 3 of an electronic component. The rubber patch 2 has a bottom surface 4, a side surface 5, and a front surface 6. The rubber patch 2 is bonded at the bottom surface 4 to an inner liner (not shown) at the inner surface of a tire. The front surface 6 of the rubber patch 2 is provided with a seating surface 7 of such a shape as to be capable of receiving the case 3. The case 3 has a bottom plate 8, a side wall 9, and a lid 10, and an electronic component (not shown) can be mounted inside the case 3. The bottom plate 8 of the case 3 has a shape engageable with the seating surface 7 of the rubber patch 2. By providing a screw thread in the bottom plate 8, it can be fixed to the seating surface 7.

Figure 2:
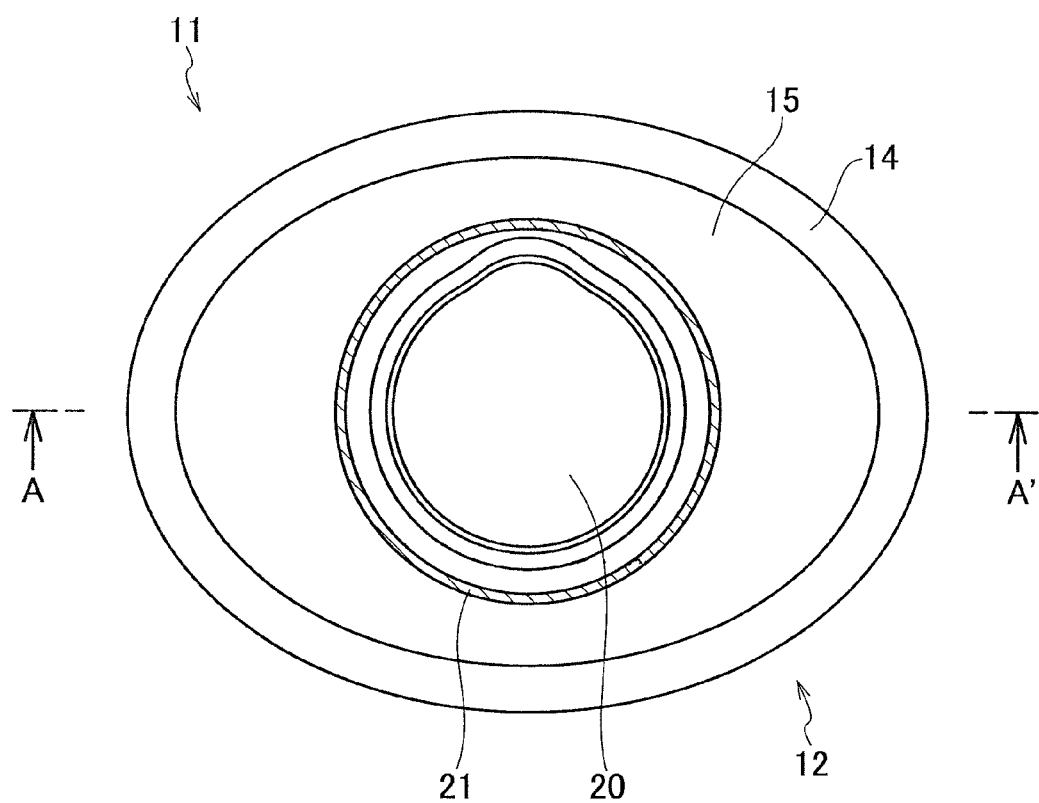
FIG. 2 is a plan view of a structure for attaching an electronic component according to the present invention.

FIG. 2 is a plan view of a structure for attaching an electronic component according to the present invention. A structure 11 for attaching an electronic component includes a rubber patch 12 and a case 13 made of resin. The rubber patch 12 has a bottom surface 14 to be attached to the inner surface of a tire, and a front surface 15 provided on the opposite side from the bottom surface 14. The bottom surface 14 of the rubber patch 12 is bonded to an inner liner (not shown) at the inner surface of the tire by using any suitable bonding means. A seating surface 17 having such a shape as to be capable of receiving the case 13 is formed in the front surface 15 of the rubber patch 12. The case 13 has a bottom plate 18, a side wall 19, and a lid 20, and an electronic component (not shown) can be mounted inside the case 13. The electronic component can include any suitable components such as a pressure sensor, a temperature sensor, and an antenna, and be mounted inside the case 13 by using any suitable means.

Figure 3:
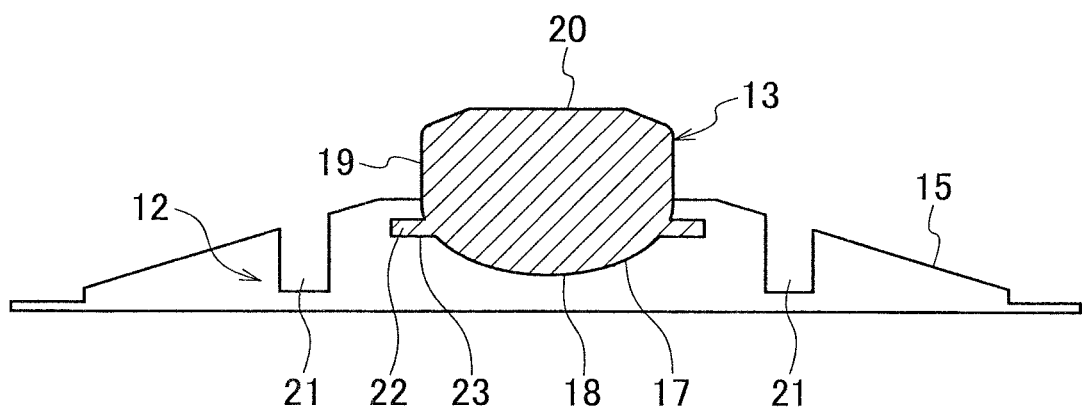
FIG. 3 is a cross-sectional view of the structure for attaching an electronic component shown in FIG. 2, taken along line A-A'.

FIG. 3 is a cross-sectional view of the structure for attaching an electronic component shown in FIG. 2, taken along line A-A'. The rubber patch 12 has a substantially circular truncated conical shape in cross section. However, the rubber patch 12 can be formed in any suitable shape with any suitable material according to the position and shape of the inner surface of the tire to which the rubber patch 12 is applied. Examples of preferred materials include a mixture of chlorobutyl rubber and natural rubber, and a mixture of styrene-butadiene rubber (SBR) and natural rubber. Typically, a rubber patch made of any of these materials is cured by being heated at a temperature of approximately 150° C. and kept at such a temperature for approximately 30 minutes. However, the time and temperature can be changed according to the required hardness.

The rubber patch 12 has a groove 21 in the front surface 15. The rubber patch 12 deforms by following deformation of the tire occurring due to its rotation. Here, the groove 21 absorbs stress resulting from the deformation of the rubber patch 12. Thus, stress that peaks around the seating surface 17, which has received the case 13, is reduced. This makes it possible to reduce to the possibility of cracking of the rubber patch and the possibility of detachment at the seating surface 17. In FIG. 3, the groove 21 is formed in parallel with the radial direction of the tire, i.e. an axis perpendicular to the bottom surface 14. However, the groove 21 can be formed at a different inclination angle. Note that the dimensions of the groove 21 are preferably within ranges where the width is 2 to 4 mm and the depth is 50% to 70% of the thickness of the rubber patch. The strength of the rubber patch 12 will drop if the dimensions of the groove 21 are greater than these values, while the stress will fail to be absorbed sufficiently if the dimensions are smaller.

The groove 21 is formed at a position away from the edge of the seating surface 17 by a predetermined distance. As mentioned above, the stress resulting from the deformation of the rubber patch 12 becomes larger toward the seating surface 17 which has received the case 13. Thus, providing the groove 21 before the seating surface 17 to absorb the stress is effective in preventing deformation of the rubber around the case 13. The groove 21 is preferably formed at a position away from the edge of the seating surface 17 by 2 to 6 mm.

Moreover, the groove 21 is formed in such a way as to surround the edge of the seating surface 17. The groove 21 is preferably in an endless shape. The distance between the groove 21 and the edge of the seating surface 17 is preferably kept substantially the same at any positions. In this way, the deformation of the rubber around the case 13 can be prevented more accurately.

As shown in FIG. 3, the front surface 15 of the rubber patch 12 is inclined such that the height of the front surface 15 becomes larger toward the case 13. In other words, the thickness of the rubber patch 12 becomes larger toward the case 13. The front surface 15 of the rubber patch 12 is preferably inclined in such a way as to join the bottom surface 14 of the rubber patch 12 at both ends of the rubber patch 12. In other words, the cross section of the rubber patch 12 at both ends of the rubber patch 12 preferably has a triangular shape as a whole.

Figure 4:
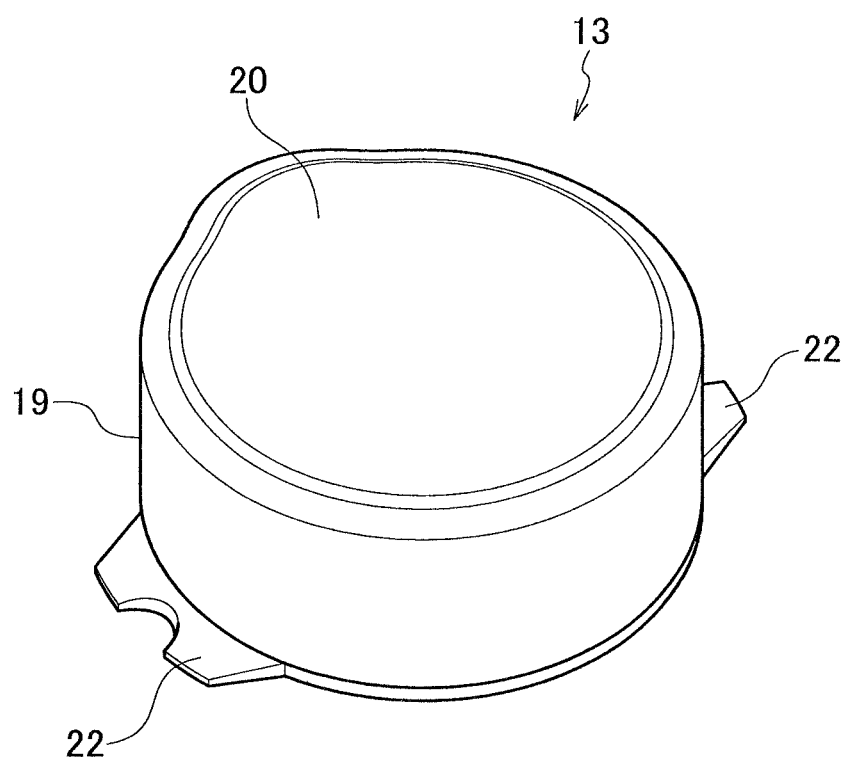
FIG. 4 is a perspective view of a case in the structure for attaching an electronic component according to the present invention.

FIG. 4 is a perspective view of the case of the structure for attaching an electronic component according to the present invention. The case 13 has protrusions 22 on the side wall 18. Specifically, the protrusions 22 are formed on a portion of the side wall 18 that is buried in the rubber patch 12. The cross-sectional shape of each protrusion 22 is not particularly limited but is a rectangular shape, for example. The rubber patch 12 has recesses 23 (FIG. 3) engageable with the protrusions 22. With the engagement of the protrusions 22 and the recesses 23, the case 13 is mechanically coupled to the rubber patch 12 and can therefore be prevented from being detached and separated. The contact surfaces of the protrusions 22 and the recesses 23 may be coated with hot-melt adhesive, for example, and the rubber patch 12 may then be vulcanized. In this way, the rubber patch 12 can be bonded completely to the case 13.

The bottom plate 18 of the case 13 has a curved shape which has its center of curvature inside the case 13. In this way, the contact surfaces of the bottom plate 18 and the seating surface 17 are subjected to less stress upon deformation of the tire. Thus, the possibility of detachment can be reduced.

EXAMPLE

Next, to further clearly demonstrate the advantageous effect of the present invention, a drum test was conducted in which a structure for attaching an electronic component according to an example of the present invention, and a structure for attaching an electronic component according to a conventional example were each mounted in a TB tire (size: 11R22.5). In the drum test, each of the tires was mounted on a drum test device and moved at 60 km/hour under a load of 3,300 kg, and the distance of travel until failure of the mounted structure for attaching an electronic component was measured. Moreover, the maximum allowable stresses of the rubber patches were compared using the finite element method (FEM). Table 1 shows the results of the drum test and the results of the FEM analysis. Note that the present invention is not limited to these examples.

TABLE 1

|  | Example | Conventional Example |
|---|---|---|
| Drum Test | No failure such as cracking when 100,000 km is traveled. | Rubber patch cracked when 70,000 km is traveled. |
| Maximum Allowable Stress by FEM Analysis (index) | 400 | 100 |

As Table 1 shows, the structure for attaching an electronic component according to the example of the present invention exhibited improved strength against stress and significantly extended durable time, as compared to the structure for attaching an electronic component according to the conventional example. In other words, the present invention was confirmed to improve the durability of the rubber patch.

It is to be noted that the entire contents of Japanese Patent Application No. 2012-098515 (filed on Apr. 24, 2012) are incorporated herein by reference.

INDUSTRIAL APPLICABILITY

The present invention brings about an advantageous effect of improving the durability of a rubber seat in a structure for attaching an electronic component to the inner surface of a pneumatic tire.

The invention claimed is:

1. A structure for attaching an electronic component to an inner surface of a pneumatic tire, comprising:
   a case which has a bottom plate, a side wall, and a lid and in which the electronic component is mounted inside an inner space defined by the bottom plate, the side wall, and the lid; and
   a support made of rubber and disposed between the case and the inner surface of the pneumatic tire, wherein
   the support has a bottom surface to be attached to the inner surface of the pneumatic tire, and a front surface provided on the opposite side from the bottom surface,
   a seating surface having a shape as to be capable of receiving the bottom plate of the case is formed in the front surface,
   the support has a groove in the front surface, and
   a depth direction of the groove is in a direction substantially perpendicular to the bottom surface.

2. The structure for attaching an electronic component according to claim 1,
   wherein the groove is separated from an edge of the seating surface by a predetermined distance.

3. The structure for attaching an electronic component according to claim 1, wherein the groove is formed in such a way as to surround an edge of the seating surface.

4. The structure for attaching an electronic component according to claim 1, wherein
   the case has a protrusion on the side wall, and
   the support has a recess engageable with the protrusion.

5. The structure for attaching an electronic component according to claim 1, wherein the bottom plate of the case has a curved shape having a center of curvature thereof inside the case.

* * * * *